Patented Dec. 4, 1928.

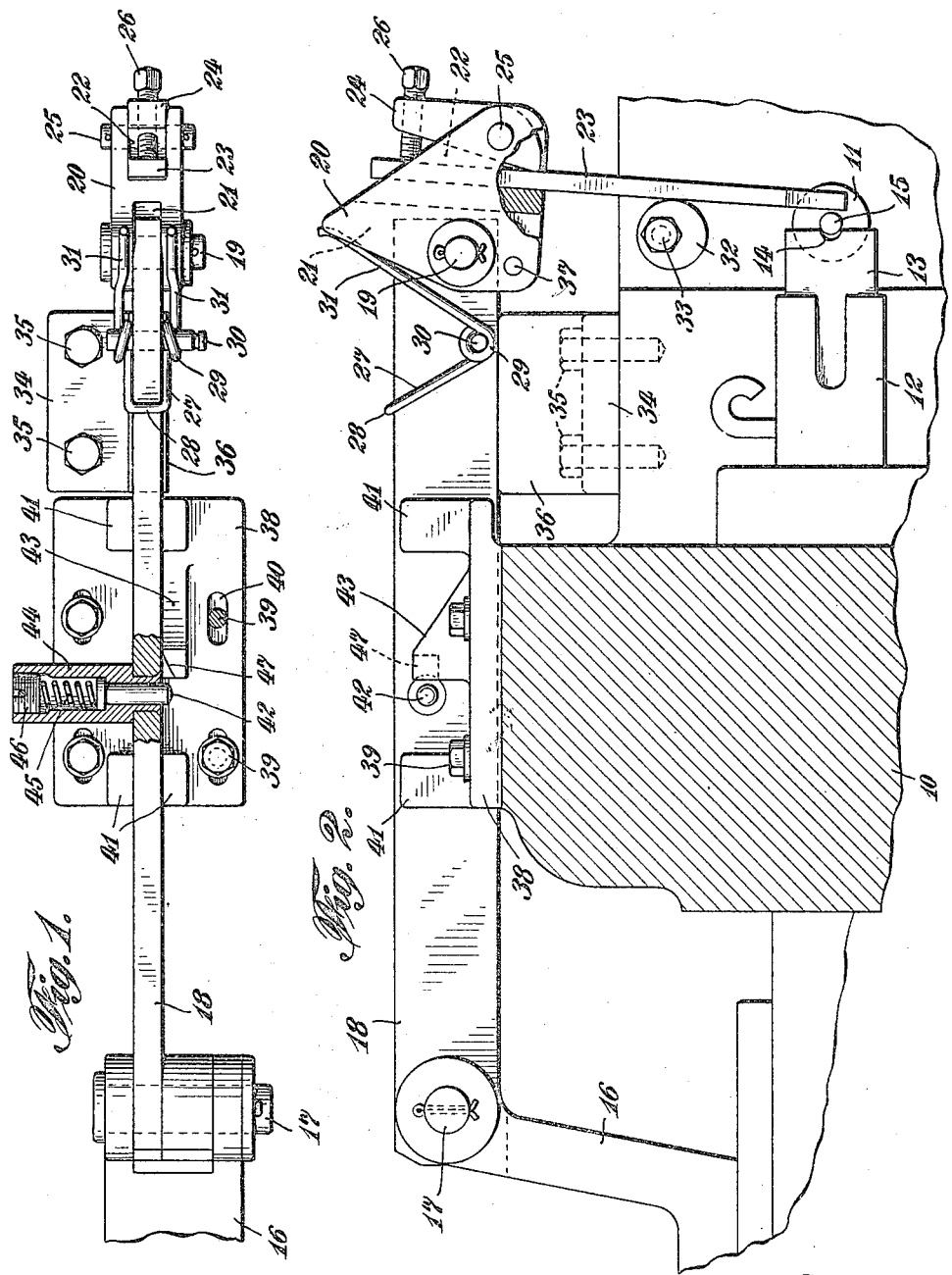

1,693,664

UNITED STATES PATENT OFFICE.

CLIFFORD O. PETITJEAN, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

TRANSFER MECHANISM FOR UPSETTING MACHINES.

Application filed May 7, 1926. Serial No. 107,383.

The invention herein disclosed relates particularly to mechanism associated with a heading, upsetting machine or the like, to carry a blank from the point where it is severed from the bar length to a station for operation thereon generally by pressure tools.

In the embodiment of the invention as shown herein, it is applied to the type of machine above mentioned, but it is adapted for use with other types of machine.

Among the objects of this invention may be recited the provision of means for supporting the bar adjacent to its finger end; simple and inexpensive pressure means for applying tension to the holder; means for varying the lifting position of the bar; and in these, and other ways, to produce mechanism of this character, composed of few parts of simple design that will operate with the maximum efficiency and with a minimum liability to break or become disarranged.

To these, and other ends, my invention consists in the transfer mechanism, having certain details of construction and combinations of parts, as will be hereinafter described and more particularly pointed out in the claims.

Referring to the drawings, in which like numerals of reference designate like parts in the several figures;

Figure 1 is a plan view of my new and improved transfer mechanism; and

Figure 2 is an elevation thereof, illustrating in connection therewith the adjacent portion of the machine with which it is associated.

That portion of the machine adjacent to this transfer mechanism, and shown herein, is old and well known in the art, an illustration of the general form and type thereof being disclosed in Letters Patent No. 1,478,356, issued to the patentee herein December 18, 1923.

As illustrated, it comprises a body member 10; a die 11 fixed therein; a cutter slide 12; and a cutter 13 having a cutter recess 14 in one face thereof, the curvature of which is substantially the same as that of the rod or blank 15, shown in Figure 2 as projecting through the opening in the die 11.

The cutter slide 12 has a reciprocatory movement parallel to its length within the body 10 and fixed thereon is the bracket 16. Pivotally connected with this bracket by the pin 17 is the carrier bar 18, shown herein as substantially rectangular in cross section with substantially parallel sides and edges, although not limited to this specific construction.

Hinged to the carrier bar 18 upon the pin 19 is the finger holder 20 formed with two substantially parallel grooves 21 and 22, into the former of which projects the end of the carrier bar 18 and in the latter of which is the finger 23. This finger is held in any of its adjusted positions against the wall at the bottom of the groove by the clamp lever 24 that is hinged to the holder by the pin 25 and by the screw 26 threaded therethrough. The lower end of this finger 23 terminates just below the cutter recess 14 in the cutter 13, and its position relatively to the cutter recess 14 may be varied by shifting the finger within the groove 22.

The finger holder 20 is moved on its pivot mounting in one direction by the pressure of a spring, shown herein as having a U-shape portion 27, the head 28 of which rests upon the top of the carrier bar 18, a coil portion 29 upon each side of the bar which encircles a fixed pin 30, and leg portions 31 which contact with and terminate adjacent to the top of the holder 20. As the leg portions 31 approximate in their length the adjacent wall of the holder 20, maximum pressure is obtained therefrom with the maximum strain upon the spring. This type of yielding mechanism for applying pressure to the holder is much more simple than the coil spring now in common use, which lies substantially parallel with the length of the bar, and by reason thereof requires a bar irregular in shape, which, by reason of such shape and the multiplicity of corners necessitated thereby, provides weak points, which under the strain to which this bar is subjected, rapidly crystallizes and breaks. With my form of spring I am enabled to use a substantially rectangular bar 18 which may be forged or produced from rolled or similar stock rather than an irregular shaped casting, or the like.

In Figure 2 the parts are shown in their relative positions, as the blank 15 is advanced through the die 11. After being so advanced a predetermined distance a portion of the rod is cut off to form the blank by the cutter slide 13, as the cutter slide moves to the right. At this time the lower end of the finger 23 engages that wall of the blank opposite to the cutter recess 14 and holds the same therein after the blank has been severed from the rod. When so positioned, the blank is carried to the right to operating tools, as is common in the art, the carrier bar 18 moving therewith and the finger 23 being held against the blank by the pressure of the spring engaging the holder 20. When in line with the operating tools the blank is moved substantially parallel to its length between the cutter 13 and finger 23 and when supported sufficiently by other parts, the cutter slide reverses its direction of movement, during which time the lower end of the finger 23 snaps over the blank against the tension of the spring engaging the tension of the holder 20. When the parts are returned to substantially the position shown in Figure 2, the finger engages the stop 32 mounted adjustably eccentrically upon a stud 33. Heretofore, in mechanism of this character, the constant hammering of the carrier bar against its support on the body member has caused the same to crystallize and break. This difficulty is very materially increased when a bar of irregular shape is used. I have found by experimentation that this liability to crystallize and break can be entirely eliminated by providing a suitable support for this carrier bar nearer to the outer end thereof than can be afforded by the body member. Such support comprises a bracket 34, which is secured to a fixed part, by the bolts 35, and is provided with a standard portion 36, which projects upwardly, and upon the top of which rests the underside of the carrier bar 18. This auxiliary support not only minimizes the danger of crystallization and break referred to herein, but also provides a steadier operating carrier bar and less vibration to the finger 23, which thereby has a more perfect hold upon the blank within the cutter.

A stop pin 37 fixed in the holder 20 is so positioned as to engage the underside of the carrier bar 18 and limit the movement of the holder 20 relatively thereto in one direction.

The bracket 38 is adjustably secured to the body member 10 by the bolts 39 which pass through the slots 40 therein. Carrier bar 18 is slidable between the lugs 41 on this bracket and its movement upon pivot mounting 17 is caused by the engagement of the plunger 42 with the bracket cam 43. This plunger is movable in one direction within the bushing 44, secured in the bar 18 by the spring 45, and in the opposite direction by its engagement with the cam face 47, this latter action being resisted by the closure plug 46. The general construction of this portion of the mechanism as just described is substantially the same as that shown in said Letters Patent No. 1,478,356. As the carrier bar is returning, after delivering a blank to the operating tools, the projecting end of the plunger 42 rides on the cam 43 and lifts the outer end of the bar, and the spring finger 23 connected therewith, upwardly through an arc, the center of which is the axis of the pin 17. This movement continues until the outer end of the plunger 42 passes over the top of cam 43 when the bar 18 drops by gravity to its down position. As the carrier bar moves forward, the pointed end of the plunger 42 engages the cam face 47, and is moved into the bushing 44 against the tension of the spring 45, which position is maintained until after the plunger has passed the cam face 43. The spring 45 now moves the plunger outwardly, to the position substantially as shown in Figure 1.

It is desirable in some classes of work, especially with blanks having short shanks, that the carrier bar should be lifted sooner than when the shanks are longer. Heretofore, in devices of this character, no means have been provided for varying this lifting position. With my improved mechanism, however, this position may be adjusted within the required range, by varying the location of the bracket 38 upon the body member 10, through manipulation of the bolts 39.

Having described my invention, what I claim as new and desire to secure by Letters Patent, is:—

1. In mechanism of the character described; a carrier bar pivotally connected with a reciprocating part; a finger having a yielding connection with the bar; means for rocking the bar upon its pivot mounting during its movement in one direction; and means associated with the first named means for varying the timing of the rocking movement of the carrier bar to permit the finger to pass over the blank after its delivery to the operating tools.

2. In mechanism of the character described; a carrier bar; means for reciprocating and rocking the same at one and the same time and means associated with the reciprocating and rocking means for varying the timing of the rocking movement of the carrier bar to permit the finger to pass over the blank after its delivery to the operating tools.

3. In mechanism of the character described; a carrier bar pivotally connected with a reciprocating part; means, comprising in part a cam, for rocking the bar upon its pivot mounting during its reciprocatory movement in one direction; and means associated with the cam whereby the same may be shifted for varying the timing of the rocking movement of the carrier bar to permit the finger to pass over the blank after its delivery to the operating tools.

4. In mechanism of the character described; a carrier bar pivotally connected with a reciprocating part; a pin yieldingly mounted relatively thereto and in one of its positions a portion thereof projects outside of the face of the bar; a cam adjustable in the direction of movement of the reciprocating bar for rocking the bar upon its pivot mounting, and means whereby the cam may be adjusted for varying the timing of the rocking movement of the carrier bar to permit the finger to pass over the blank after its delivery to the operating tools.

5. In mechanism of the character described; a carrier bar pivotally connected with a reciprocating part; and companion brackets upon which the bar slides while moving in one direction, one of said brackets being movable and the other fixed, and means whereby said movable bracket effects rocking movement of the carrier bar and varies the timing of such rocking movement when the movable bracket is shifted in the direction of travel of the bar.

6. In mechanism of the character described; a carrier bar; a finger holder having substantially parallel grooves in the opposite ends thereof and into one of which projects one end of the carrier bar; a pivot pin connection between the holder and bar; a finger secured within the second groove of the holder; a spring mounted between its ends upon the bar having a U-shape portion extending therearound, and projecting leg portions, one upon each side of the bar that contact with one of the cheeks of the finger holder at a point above the top of the bar.

7. In mechanism of the character described; a carrier bar; a finger holder having substantially parallel grooves therein, one at the front of the holder and the other at the rear thereof and into which projects the end of the bar; a pivot pin connection between the holder and bar, whereby the holder has a hinged connection with the bar in a position wherein the top of the holder is above the top of the bar; a finger within the groove at the front of the holder; and a spring having leg portions thereon, there being one leg portion upon each side of the bar, which leg portions engage the finger holder at a point adjacent to the top thereof and above the top of the bar.

8. In mechanism of the character described, a pivotally mounted carrier bar having a reciprocating movement; means for rocking the carrier bar upon its pivot mounting when the same is near, or at the limit of its movement in one direction; a finger having a pivotal connection with the carrier bar; and means for rocking the same relatively to the bar, the rocking movement of the carrier bar upon its mounting and of the finger upon its mounting being at substantially at the beginning and ending respectively of the movement of the carrier bar when traveling in one direction.

In testimony whereof, I have hereunto affixed my signature.

CLIFFORD O. PETITJEAN.